United States Patent
Janssen et al.

(10) Patent No.: US 6,921,985 B2
(45) Date of Patent: Jul. 26, 2005

(54) LOW VOLTAGE RIDE THROUGH FOR WIND TURBINE GENERATORS

(75) Inventors: Wilhelm Janssen, Saterland (DE); Henning Luetze, Bad Bentheim (DE); Andreas Buecker, Hasbergen (DE); Till Hoffmann, Georgsmarienhütte (DE); Ralf Hagedorn, Neuenkirchen (DE)

(73) Assignee: General Electric Company, Schenectady, NY (US)

( * ) Notice: Subject to any disclaimer, the term of this patent is extended or adjusted under 35 U.S.C. 154(b) by 102 days.

(21) Appl. No.: 10/350,452

(22) Filed: Jan. 24, 2003

(65) Prior Publication Data
US 2004/0145188 A1 Jul. 29, 2004

(51) Int. Cl.[7] .............................. F03D 9/00; H02P 9/04
(52) U.S. Cl. .............................. 290/44; 290/52; 290/55
(58) Field of Search .............................. 290/44, 55, 43, 290/42, 52, 53; 307/64

(56) References Cited

U.S. PATENT DOCUMENTS

| | | | | |
|---|---|---|---|---|
| 4,331,881 A | * | 5/1982 | Soderholm et al. | 290/44 |
| 4,525,633 A | * | 6/1985 | Wertheim et al. | 290/44 |
| 4,700,081 A | * | 10/1987 | Kos et al. | 290/44 |
| 4,764,838 A | * | 8/1988 | MacFarlane | 361/21 |
| 4,777,376 A | * | 10/1988 | Dishner | 290/4 R |
| 5,028,804 A | * | 7/1991 | Lauw | 290/40 C |
| 6,265,785 B1 | * | 7/2001 | Cousineau et al. | 290/44 |
| 6,428,274 B1 | | 8/2002 | Hehenberger | |

FOREIGN PATENT DOCUMENTS

| | | |
|---|---|---|
| GB | 2 023 237 | 12/1979 |
| WO | WO 93/11604 | 6/1993 |
| WO | WO 01/73518 | 10/2001 |
| WO | PCT/US2004/001774 | 6/2004 |

* cited by examiner

Primary Examiner—Darren Schuberg
Assistant Examiner—Leda Pham
(74) Attorney, Agent, or Firm—Blakely, Sokoloff, Taylor & Zafman LLP

(57) ABSTRACT

A wind turbine. The wind turbine includes a blade pitch control system to vary a pitch of one or more blades and a turbine controller coupled with the blade pitch control system. A first power source is coupled with the turbine controller and with the blade pitch control system to provide power during a first mode of operation. Uninterruptible power supplies coupled to the turbine controller and with the blade pitch control system to provide power during a second mode of operation. The turbine controller detects a transition from the first mode of operation to the second mode of operation and causes the blade pitch control system to vary the pitch of the one or more blades in response to the transition.

45 Claims, 6 Drawing Sheets

LOW VOLTAGE RIDE THROUGH FOR WIND TURBINE GENERATORS

FIELD

The invention relates to wind turbine generators. More particularly, the invention relates to supporting low voltage ride through for wind turbine generators coupled with a power distribution grid.

BACKGROUND

Historically, wind turbines have been very small contributors to overall power generation to supply electrical grids. The low unit ratings (<100 kW) and the uncertain availability of wind sources caused wind turbine generators to be ignored when power grid operators considered the security of the grid. However, wind turbine generators with ratings of 1.5 MW or more are now available. Furthermore, many power generation developers are installing wind farms having one hundred or more wind turbine generators. The "block" of power available from wind farms with 1.5 MW wind turbine generators is comparable to a modern gas turbine generator. Accordingly, wind turbine generators are increasingly feasible sources of power for the power grid.

In order to reliably supply power to the power grid, wind turbine generators (as well as other types of generators) must conform to power grid interconnection standards that define requirements imposed on power suppliers and large power consumers. In particular, a "low voltage ride through" (LVRT) requirement typically requires that a power generation unit must remain connected and synchronized to the grid when the voltage at the terminals of the generation unit fall to prescribed levels.

The LVRT requirement has been addressed in steam and gas turbine generator plants through use of vital electrical buses that are powered by DC power sources and by auxiliary buses connected to the generators. These types of generations are generally more resistant to voltage fluctuations than wind turbine generators.

In the past, wind turbine generators have been allowed to trip offline during a low voltage event. For example, the most common safety concept of wind turbine generators is a battery buffered pitch system, which typically includes three independent battery packs. With this type of system it is possible to turn the blades of the wind turbine from an operating position to a park position when generator power is not available.

During a power failure, the pitch drives are switched from a generator powered drive to a battery powered drive until the blades reach the park position. The park position is typically defined by an end limit switch that disconnects the motor from the batteries. The movement of the blades to the park position occurs automatically as the result of a voltage or frequency error. However, this does not satisfy LVRT requirements because the wind turbine generator is allowed to trip offline.

Currently, wind turbine generators specifications can require connection and synchronization with the power grid down to levels of 70% of rated voltage. These requirements can be accommodated through, for example, increased capacity in various components (motors, generators, converters, etc.) and by use of uninterruptible power supplies (UPSs) for sensitive control circuits. However, more severe voltage fluctuations, for example, voltages at 15% of rated voltage cannot be accommodated using these techniques.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

The techniques described herein allow a wind turbine generator to provide one or more of the following features: 1) to remain synchronized to the power grid during severe voltage fluctuations, 2) to maintain functioning of the blade pitch system in spite of lack of voltage at the generator terminals, 3) to protect the power converter and generator from high voltages and currents during the voltage fluctuation, and 4) to temporarily shut down non-vital subsystems that could be damaged by exposure to low voltages or could be tripped by either circuit breaker action or fuse operation.

Figure 1:
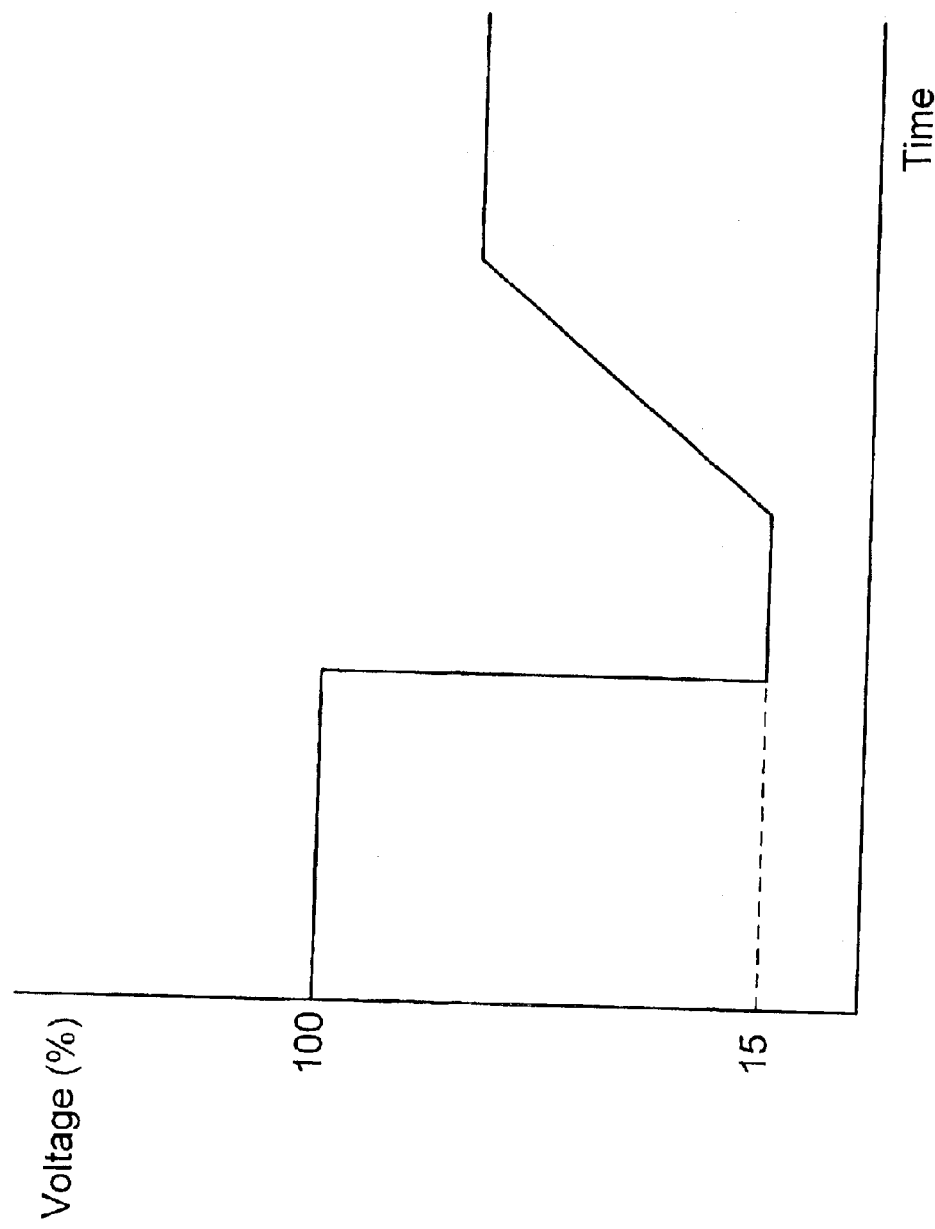
FIG. 1 is graph of voltage versus time for an example voltage fluctuation event.

FIG. 1 is a graph of voltage versus time for an example voltage fluctuation event. In the example of FIG. 1, the voltage drops from 100% of the generation unit's rated voltage to 15% of the generation unit's rated voltage. After the fluctuation, the voltage returns to a higher level. During this voltage fluctuation, the wind turbine generator must remain connected to and synchronized with the power grid to satisfy low voltage ride through specifications.

Figure 2:
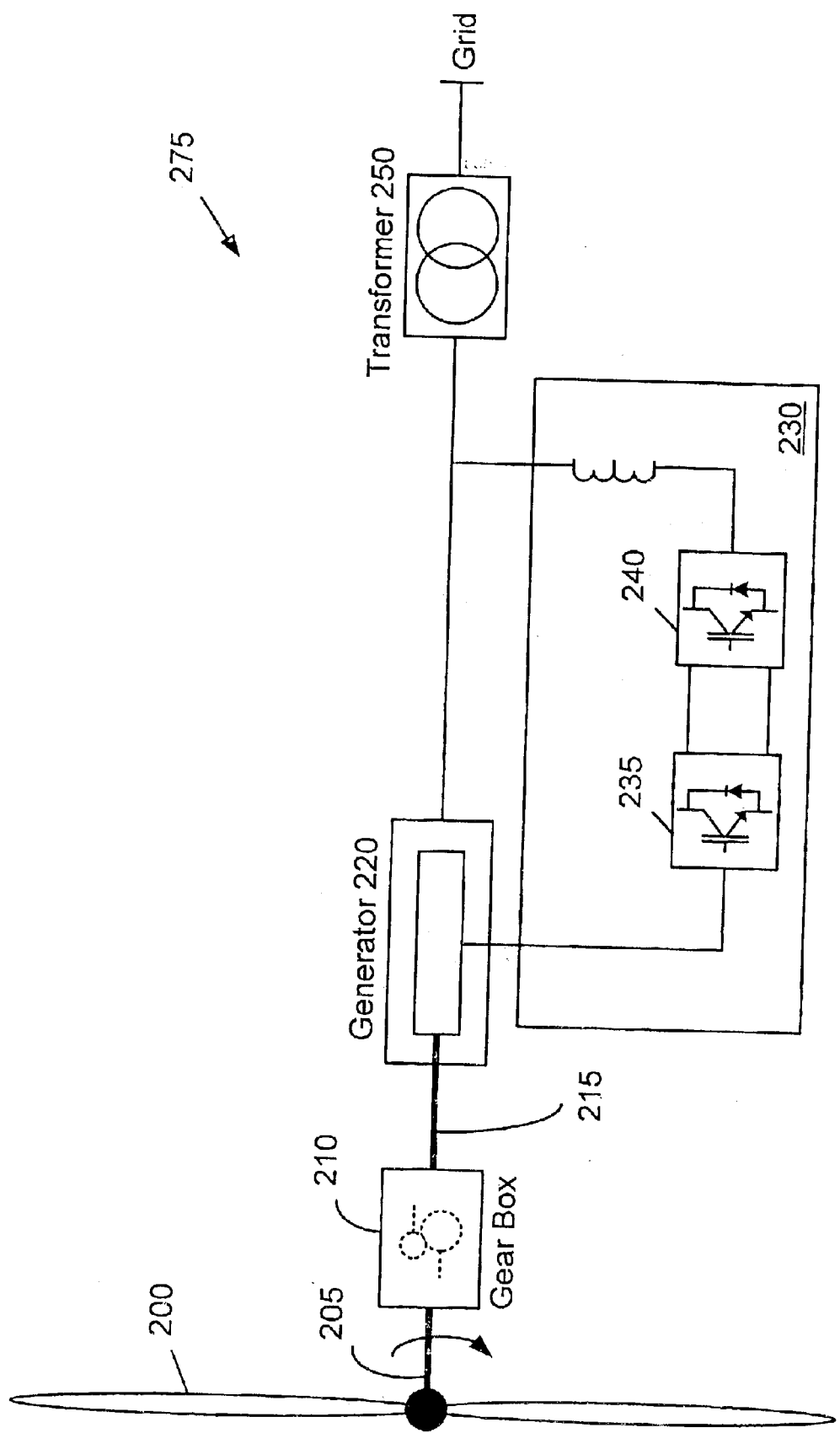
FIG. 2 is a schematic illustration of one embodiment of a wind turbine generator.

FIG. 2 is a schematic illustration of one embodiment of a wind turbine generator. Wind imparts energy to blades 200 connected to rotor 205. The pitch of blades 200 can be varied by control devices (not illustrated in FIG. 2). The pitch control system varies the pitch of blades 200 as wind speed varies to control rotor speeds and prevent overspeeds. Typical rotor speeds are in the range of 10–20 revolutions per minute; however, other rotor speed ranges can also be supported. Pitching of blades is well-known in the art.

Rotor 205 is connected to gear box 210 that increases the shaft speed to a desired range. Typical gear ratios are in the range of 100:1 such that rotor speeds of 10–20 revolutions per minute result in 1000–2000 revolutions per minute at high-speed shaft 215. Other gear ratios and other speeds can also be used. High-speed shaft 215 drives generator 220 at variable speeds, depending on the wind speed.

Generator 220 produces a torque that balances the torque produced by rotor 205. Without other components, generator 220 would produce a variable frequency power output that would be unsuitable for connection to the power grid.

Power converter 230, which includes back-to-back inverters 235 and 240, provides variable frequency power to the rotor of generator 220. The combination of the variable rotor speed and the variable frequency power to the generator rotor allows the generator to produce constant frequency power at voltage levels suitable for the power grid (e.g., 575 VAC). In one embodiment, inverters 235 and 240 are Integrated Gate Bipolar Transistor (IGBT) power inverters. Power inverters for use in wind turbine generators are known in the art and any appropriate power inverters can be used.

Transformer 250 matches the output of the wind turbine generator to the voltage of the local power grid. The overall control of wind turbine generator 275 is managed by a controller that operates the various systems of wind turbine generator 275. These systems include, for example, power converter 230, the pitch, lubricating and cooling systems (not illustrated in FIG. 2), and the yaw system. Many of these systems are sensitive to voltage fluctuations and could be damaged if the voltages of the wind turbine electrical system are too high or too low. In particular, the turbine controller monitors the wind speed and issues torque commands to power converter 230 and pitch commands to the pitch system so that the power output of wind turbine generator 275 matches the wind conditions and the rotor speed is held below the overspeed limit.

As described in greater detail below with respect to FIG. 4, use of a converter controller that monitors the current in one or both of the inverters to selectively enable a current limiting circuit can protect against damage that can be caused by high currents during a low voltage event. In one embodiment, a crowbar circuit is selectively enabled to shunt current away from the inverters and/or other components that can be damaged by excessive currents.

Figure 3:
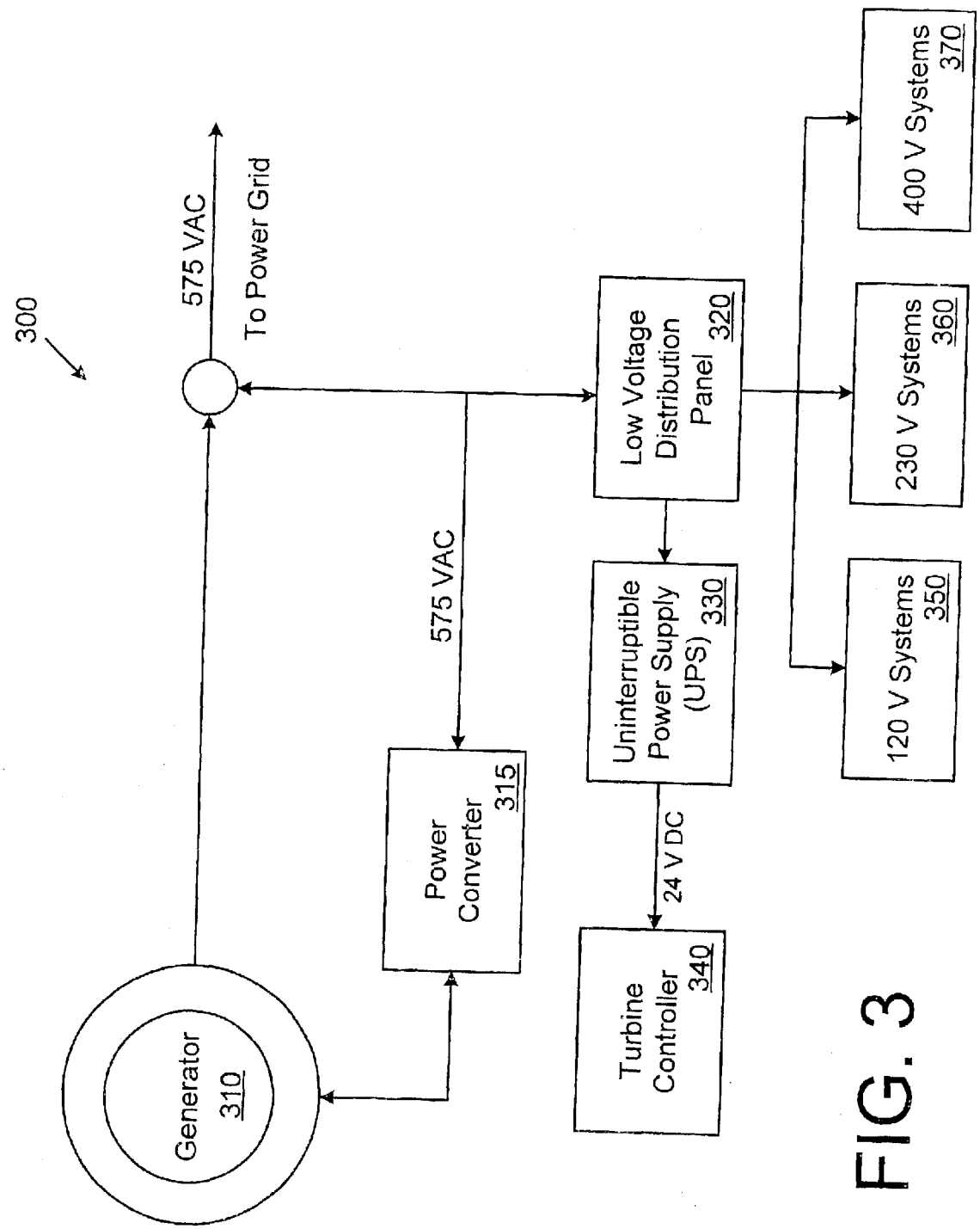
FIG. 3 is a block diagram of one embodiment of an electrical system of a wind turbine generator.

FIG. 3 is a block diagram of one embodiment of an electrical system of a wind turbine generator. The example of FIG. 3 provides specific voltages that are typical for wind turbine generators in the 1.5 MW class for use in the United States. Other similar voltages can be used for 50 Hz wind turbine generators. In general, higher voltages are used for higher power ratings and lower voltages are used for lower power ratings. However, the overall architecture is applicable for many different types and sizes of wind turbines.

Generator 310 provides AC power to the power grid as well as to other components of wind turbine electrical system 300. In one embodiment, generator 310 provides 575 V (which is the rated voltage of the generator); however, any voltage can be provided. Generator 310 also provides power to power converter 315, which operates as described above with respect to FIG. 2, and to low voltage distribution panel (LVDP) 320.

In one embodiment, LVDP 320 includes a transformer to transform the 575 V power received from generator 310 to 120 V, 230 V and 400 V power for use throughout the wind turbine (120 V systems 350, 230 V systems 360 and 400 V systems 370, respectively). Other and/or additional power supply levels can be provided as desired. The wind turbine generator systems connected to LDVP 320 include, for example, the pitch system controls and motors, the yaw system controls and motors, various lubrication and cooling systems, electrical receptacles and lights, heaters and miscellaneous equipment.

In one embodiment, LVDP 320 provides 24 V DC power to turbine controller 340 through uninterruptible power supply (UPS) 330. UPS 330 provides power to turbine controller 340 in the event that LVDP 320 is unable to provide necessary power to turbine controller 340. UPS 330 can be any type of uninterruptible power supply known in the art, for example, a battery system, a photovoltaic system or any other power storage system known in the art. In one embodiment, UPS 330 does not have sufficient capacity to energize all of the electrical loads served by LVDP 320.

Some of the components of the configurations of FIGS. 2 and 3 are susceptible to damage caused by voltage fluctuations in the high voltage (575 V) power supply. Higher voltages can cause failures such as, for example, insulation breakdown and high currents in certain components. Low voltages can cause components such as, for example, motors to draw excessive current to counteract the lower voltages. The high currents can lead to blown fuses, tripped circuit breakers or excessive heating if the low voltage condition persists.

Power converters and generators are particularly susceptible to voltage fluctuations. Generators can store magnetic energy that can be converted to high currents when the generator terminal voltage decreases quickly. Those currents can cause failure of the semiconductor devices of power converters coupled with the generators.

When the voltage falls to levels as illustrated in FIG. 1, it is likely that there are faults that prevent the wind turbine generator from exporting energy to the power grid. If the wind continues to impart energy to the turbine rotor, the wind turbine generator as a whole absorbs energy that can only be stored as rotational kinetic energy in the form of higher rotor speeds. Unless specific actions are taken, the rotor can reach its overspeed limit and cause the wind turbine generator to trip off line. In one embodiment, uninterruptible power supply 330 is used to provide power to turbine controller 340 and/or other components of the wind turbine during low voltage events.

As described in greater detail below, in order to protect the wind turbine generator against low voltage events, power converter 315 is powered by an uninterruptible power supply and includes a protective circuit that maintains currents within an allowable range. The converter controller selectively activates and deactivates the protective circuit to maintain current flow within an acceptable range. Turbine controller 340 is also powered by an uninterruptible power supply and operates to prevent overspeed trips. One or more non-vital loads are de-energized during the low voltage event if necessary to protect those components from potential damage.

Figure 4:
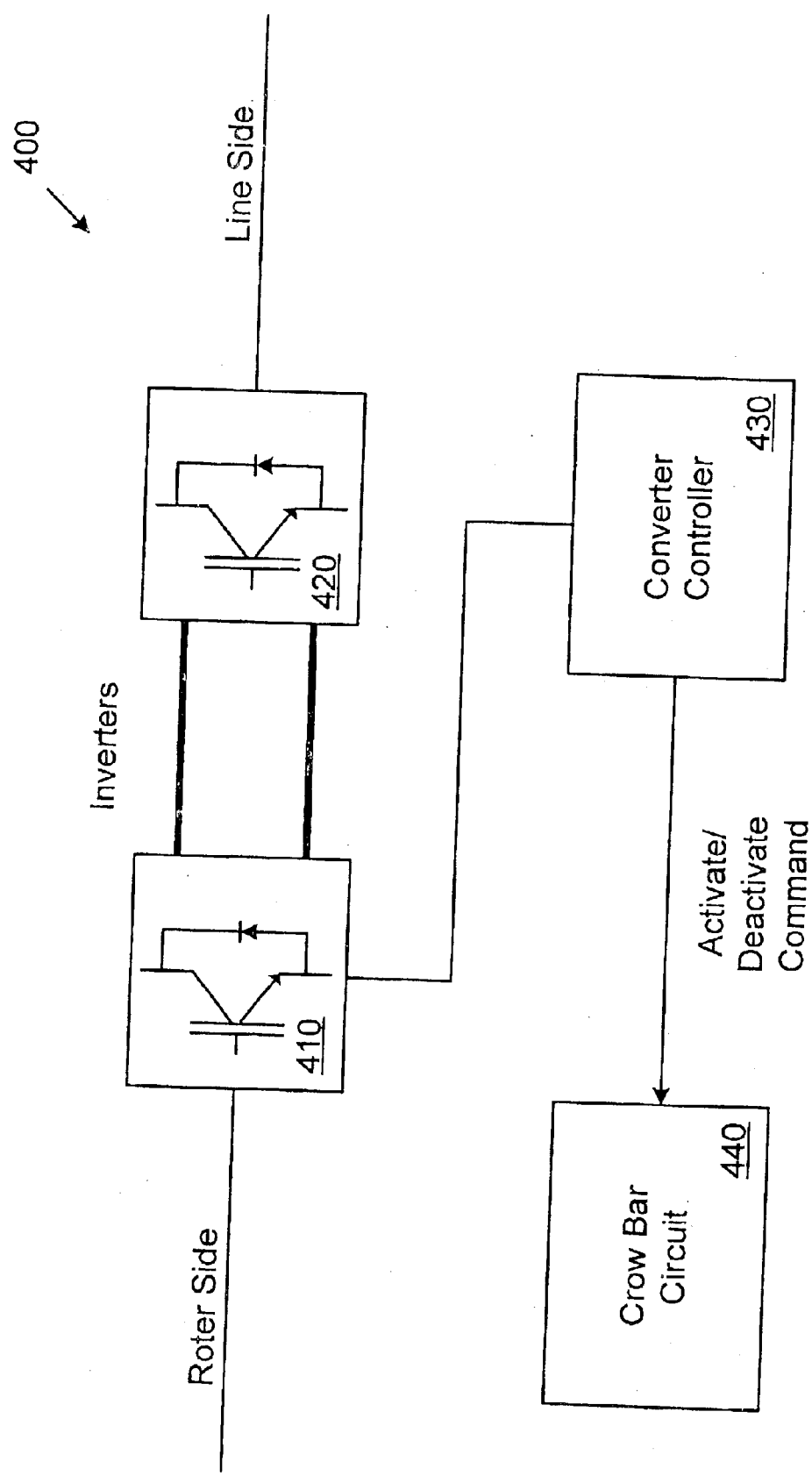
FIG. 4 is a block diagram of one embodiment of a power converter having functionality to respond to a low voltage event.

FIG. 4 is a block diagram of one embodiment of a power converter having functionality to respond to a low voltage event. In one embodiment, power converter 400 includes inverters 410 and 420, converter controller 430 and crowbar circuit 440. Other components can also be included in power converter 400.

Inverter 410 is coupled with the generator (not illustrated in FIG. 4) and to inverter 420 which is coupled with the power grid. Crowbar circuit 440 is coupled with the output of the generator rotor. Converter controller 430 is coupled to receive data indicating the current flowing in inverter 410 and to control crowbar circuit 440. In one embodiment, converter controller 430 selectively activates and deactivates crowbar circuit 440 to maintain the current in inverter 410 within an acceptable range.

Crowbar circuits are known in the art and any appropriate (e.g., a circuit having sufficient power ratings) crowbar circuit can be used. In general, crowbar circuit 440 operates to shunt current from the generator rotor and inverter 410 and maintain inverter currents within safe levels. Thus, during normal operation crowbar circuit 440 is inactive. During a low voltage event converter controller 430 selectively activates crowbar circuit 440 to maintain current levels in a safe range. Thus, crowbar circuit 440 and converter controller 430 are part of a system that allows a wind turbine generator to ride through low voltage events and remain synchronized to the power grid.

In order to control crowbar circuit 440, converter controller 430 monitors rotor side currents (e.g., current in inverter 410) and selectively activates and deactivates crowbar circuit 440 when current levels are detected that are dangerous for the semiconductor components of power converter 400. Thus, converter controller 430 and crowbar circuit 440 operate to protect power converter 400 from damage as the result of a low voltage event.

Figure 5:
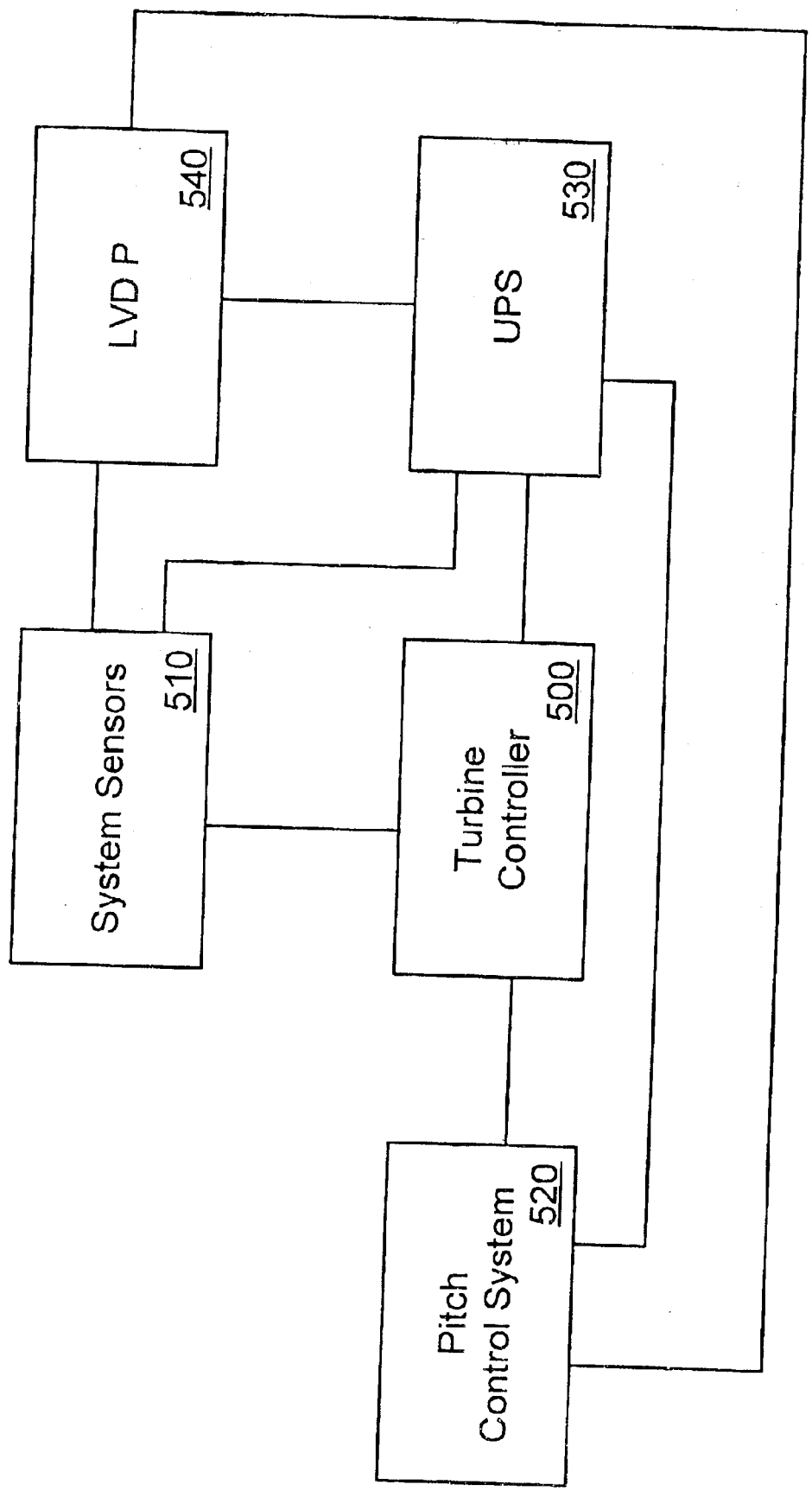
FIG. 5 is a block diagram of one embodiment of a turbine controller and associated components for use in a wind turbine generator.

FIG. 5 is a block diagram of one embodiment of a turbine controller and associated components for use in a wind turbine generator. In one embodiment, the turbine controller is implemented in the form of a programmable logic controller (PLC); however, other implementations can also be used. In one embodiment, the turbine controller starts the turbine as its minimum wind speed (cut-in speed), matches generator power output to wind speed, controls the blade pitch to match wind speed and avoid overspeed trips, shuts down the turbine at its maximum wind speed (cut-out speed) and points the wind turbine generator into the wind using the yaw system. The turbine controller can also provide other functionality, for example, control heaters, lighting, the supervisory control and data acquisition (SCADA) system.

To support low voltage ride through capability, turbine controller 500 detects a low voltage event and responds to the event. Turbine controller 500 is coupled to system sensors 510, which provide data indicating the status of various wind turbine generator system components, for example, rotor speed and generator output voltage. Turbine controller 500 processes these data to determine whether a low voltage event has occurred.

In one embodiment, in response to a low voltage event, turbine controller 500 switches pitch control system 520 from active control in which the electronics and motors are powered by LVDP 540 to a mode in which the motors are powered by UPS 530. In one embodiment, the pitch motors are powered by the UPS 530 to ensure there is power to pitch the blades to the feathered position. The power from UPS 530 allows turbine controller 500 and pitch control system 520 to control the pitch of the blades during a low voltage event. For example, pitch control system 520 can feather the blades to slow or stop rotation of the rotor shaft. UPS 530 can also allow pitch control system 520 to operate during a transient voltage event until full power is restored.

In one embodiment, UPS 530 also provides power to one or more sensors during a low voltage event. For example, UPS 530 can provide power to rotor speed sensors so that turbine controller 500 can monitor the speed of the rotor during a low power event. Turbine controller 500 can use the data from the sensor to determine whether an overspeed condition will occur and respond appropriately.

In one embodiment, turbine controller 500 includes control circuitry to shut off power to non-critical systems in the wind turbine generator in response to a low voltage event. The loads can include, for example, the yaw system and other loads that could cause fuses to open and/or circuit breakers to switch. Typically, these loads contain motors that draw high current during low voltage events in order to maintain performance. Other non-critical loads, for example, heaters and lights are more resistant to damage as the result of a low voltage event and can be left connected to LVDP 540.

UPS 530 also provides power to the converter controller (not illustrated in FIG. 5) to allow the converter controller to guard against excessive currents in the inverters, as described above with respect to FIG. 4. In one embodiment, the converter controller is powered by capacitors that store energy that is used during a low voltage event.

Figure 6:
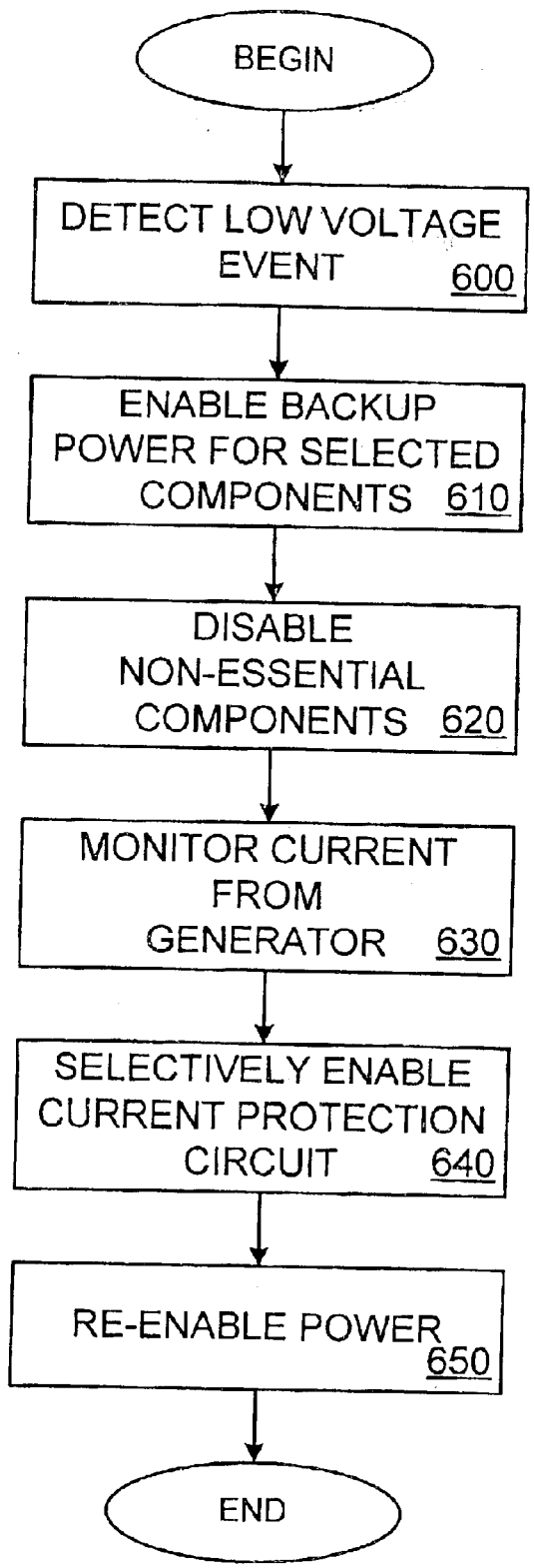
FIG. 6 is a flow diagram of one embodiment of a process for low voltage ride through in a wind turbine generator.

FIG. 6 is a flow diagram of one embodiment of a process for low voltage ride through in a wind turbine generator. The process of FIG. 6 is presented in a specific order as an example only. The order of certain portions of the process can be changed without deviating from the invention.

A low voltage event is detected, 600. The specific voltages that trigger a low voltage event are equipment-specific. In one embodiment, the threshold voltage that is considered a transition to a low voltage event is defined as a percentage of rated voltage. For example, a voltage that is less than 75% of the generator's rated voltage can be considered a low voltage event. As another example, a voltage that is 50% of the generator's rated voltage or a voltage that is between 15% and 50% of the generator's rated voltage can be considered a low voltage event. Low voltage events can also be defined in terms of time, for example, a voltage at 75% of the generator's rated voltage form more that 0.5 seconds can be considered a low voltage event. Other ranges and/or voltages can also be used to define a low voltage event.

When a low voltage event is detected, backup power is enabled to selected components, 610. In one embodiment, power is provided from an uninterruptible power supply, for example, a battery power supply, to wind turbine components that are necessary to keep the wind turbine generator connected to and synchronized with the power grid during the low voltage event. For example, power can be provided to all or part of a power converter, to a turbine controller and/or a blade pitch control system. In one embodiment, in order to avoid rotor overspeed conditions, power is provided by the uninterruptible power supply to monitor rotor speed and to control the blade pitch system motors.

Power to non-essential elements or elements that can be damaged by low voltage, high current conditions is disabled, 620. For example, the motors and other components of the yaw system can be disabled during a low voltage event.

The controller in the power converter monitors the current from the generator rotor to the inverter, 630. If the current exceeds a threshold value, the converter controller enables a current limiting circuit, 640. In one embodiment, the current limiting circuit is a crowbar circuit. The threshold current value is determined by the current flow that would damage semiconductor components of the power converter. When the low power event has ended, power from the generator is restored and the wind turbine components operate under normal conditions, 650.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A wind turbine generator comprising:
   a blade pitch control system to vary a pitch of one or more blades;

a turbine controller coupled with the blade pitch control system;

a first power source coupled with the turbine controller and with the blade pitch control system to provide power during a first mode of operation; and an uninterruptible power supply coupled to the turbine controller and with the blade pitch control system to provide power during a low voltage event;

wherein the turbine controller causes the blade pitch control system to vary the pitch of the one or more blades in response to the transition in response to detection of a transition from the first mode of operation.

2. The wind turbine generator of claim 1 wherein a low voltage event comprises a generator output voltage of less than 75% of a rated voltage for the generator.

3. The wind turbine generator of claim 2 wherein the low voltage event occurs for up to 3 seconds.

4. The wind turbine generator of claim 1 wherein a low voltage event comprises a generator output voltage of less than 50% of a rated voltage for the generator.

5. The wind turbine generator of claim 4 wherein the low voltage event occurs for up to 3 seconds.

6. The wind turbine generator of claim 1 wherein a low voltage event comprises a generator between 15% and 50% of a rated voltage for the generator.

7. The wind turbine generator of claim 6 wherein the low voltage event occurs for up to 3 seconds.

8. The wind turbine generator of claim 1 wherein the first power source comprises a generator.

9. The wind turbine generator of claim 8 further comprising a power converter coupled to a generator, the power converter comprising:

an inverter coupled to receive power from the generator;

a converter controller coupled with the inverter to monitor a current flow in the inverter;

a circuit coupled with the input of the inverter and with the converter controller, the circuit to shunt current from the inverter in response to a control signal from the converter controller.

10. The wind turbine generator of claim 9 wherein the circuit comprises a crowbar circuit.

11. The wind turbine generator of claim 9 wherein the converter controller is coupled to the first power source to receive power during the first mode of operation and to the uninterruptible power supply to receive power during the low voltage event.

12. The wind turbine generator of claim 1 wherein the uninterruptible power supply comprises a battery power supply.

13. The wind turbine generator of claim 1 wherein the uninterruptible power supply comprises a photovoltaic power supply.

14. The wind turbine generator of claim 1 wherein the uninterruptible power supply comprises one or more capacitors.

15. A wind turbine generator comprising:

a generator;

a power converter coupled with the generator, the power converter having an inverter coupled to receive power from the generator, a converter controller coupled with the inverter to monitor a current flow in the inverter wherein the converter controller is coupled to receive power from an uninterruptible power supply during a low voltage event, and a circuit coupled with the input of the inverter and with the converter controller to shunt current from the inverter and generator rotor in response to a control signal from the converter controller.

16. The wind turbine generator of claim 15 wherein the circuit comprises a crowbar circuit.

17. The wind turbine generator of claim 15 wherein the converter controller is coupled to the generator to receive power during a first mode of operation and to an uninterruptible power supply to receive power during a low voltage event.

18. The wind turbine generator of claim 17 wherein the uninterruptible power supply comprises a battery power supply.

19. The wind turbine generator of claim 17 wherein the uninterruptible power supply comprises a photovoltaic power supply.

20. The wind turbine generator of claim 17 wherein the uninterruptible power supply comprises one or more capacitors.

21. The wind turbine generator of claim 17 further comprising:

a blade pitch control system to vary a pitch of one or more blades; and a turbine controller coupled with the blade pitch control system, wherein the turbine controller detects a transition from the first mode of operation and causes the blade pitch control system to vary the pitch of the one or more blades in response to the transition.

22. The wind turbine generator of claim 17 wherein a second mode of operation comprises a low voltage event.

23. The wind turbine generator of claim 22 wherein a low voltage event comprises a generator output voltage of less than 75% of a rated voltage for the generator.

24. The wind turbine generator of claim 23 wherein the low voltage event occurs for up to 3 seconds.

25. The wind turbine generator of claim 22 wherein a low voltage event comprises a generator output voltage of less than 50% of a rated voltage for the generator.

26. The wind turbine generator of claim 25 wherein the low voltage event occurs for up to 3 seconds.

27. The wind turbine generator of claim 22 wherein a low voltage event comprises a generator between 15% and 50% of a rated voltage for the generator.

28. The wind turbine generator of claim 27 wherein the low voltage event occurs for up to 3 seconds.

29. A method comprising:

providing power to wind turbine components using a generator of the wind turbine;

detecting a low voltage event;

receiving power from an uninterruptible power supply to a first subset of wind turbine components, wherein the first subset of wind turbine components comprises a blade pitch controller to selectively power the blade pitch controller to maintain a rotor speed below a predetermined overspeed limit during the low voltage event; and disconnecting a second subset of wind turbine components from the generator during the low voltage event.

30. The method of claim 29 wherein the uninterruptible power supply comprises a battery power supply.

31. The method of claim 29 wherein the uninterruptible power supply comprises a photovoltaic power supply.

32. The method of claim 29 wherein the uninterruptible power supply comprises one or more capacitors.

33. The method of claim 29 wherein a low voltage event comprises a generator output voltage of less than 75% of a rated voltage for the generator.

34. The method of claim 33 wherein the low voltage event occurs for up to 3 seconds.

35. The method of claim 29 wherein a low voltage event comprises a generator output voltage of less than 50% of a rated voltage for the generator.

36. The method of claim 35 wherein the low voltage event occurs for up to 3 seconds.

37. The method of claim 29 wherein a low voltage event comprises a generator between 15% and 50% of a rated voltage for the generator.

38. The method of claim 37 wherein the low voltage event occurs for up to 3 seconds.

39. An apparatus comprising:

means for providing power to wind turbine components using a generator of the wind turbine;

means for detecting a low voltage event;

means for providing power from an uninterruptible power supply to a first subset of wind turbine components, wherein the first subset of wind turbine components comprises a blade pitch controller to selectively power the blade pitch controller to maintain a rotor speed below a predetermined overspeed limit during the low voltage event; and means for disconnecting a second subset of wind turbine components from the generator during the low voltage event.

40. The apparatus of claim 39 wherein a low voltage event comprises a generator output voltage of less than 75% of a rated voltage for the generator.

41. The apparatus of claim 40 wherein the low voltage event occurs for up to 3 seconds.

42. The apparatus of claim 39 wherein a low voltage event comprises a generator output voltage of less than 50% of a rated voltage for the generator.

43. The apparatus of claim 42 wherein the low voltage event occurs for up to 3 seconds.

44. The apparatus of claim 39 wherein a low voltage event comprises a generator between 15% and 50% of a rated voltage for the generator.

45. The apparatus of claim 44 wherein the low voltage event occurs for up to 3 seconds.

* * * * *

INTER PARTES REEXAMINATION CERTIFICATE (1216th)
United States Patent
Janssen et al.

(10) Number: US 6,921,985 C1
(45) Certificate Issued: Jan. 8, 2016

(54) LOW VOLTAGE RIDE THROUGH FOR WIND TURBINE GENERATORS

(75) Inventors: Wilhelm Janssen, Saterland (DE); Henning Luetze, Bad Bentheim (DE); Andreas Buecker, Hasbergen (DE); Till Hoffmann, Georgsmarienhütte (DE); Ralf Hagedorn, Neuenkirchen (DE)

(73) Assignee: GENERAL ELECTRIC COMPANY, Schenectady, NY (US)

Reexamination Request:
No. 95/000,580, Oct. 22, 2010

Reexamination Certificate for:
Patent No.: 6,921,985
Issued: Jul. 26, 2005
Appl. No.: 10/350,452
Filed: Jan. 24, 2003

(51) Int. Cl.
*F03D 7/02* (2006.01)
*H02P 9/10* (2006.01)
*H02P 101/15* (2015.01)
*H02P 9/00* (2006.01)
*F03D 7/04* (2006.01)

(52) U.S. Cl.
CPC .......... *F03D 7/0224* (2013.01); *F03D 7/0284* (2013.01); *F03D 7/042* (2013.01); *H02P 9/007* (2013.01); *H02P 9/10* (2013.01); *H02P 2101/15* (2015.01); *Y02E 10/723* (2013.01)

(58) Field of Classification Search
None
See application file for complete search history.

(56) References Cited

To view the complete listing of prior art documents cited during the proceeding for Reexamination Control Number 95/000,580, please refer to the USPTO's public Patent Application Information Retrieval (PAIR) system under the Display References tab.

*Primary Examiner* — Robert Nasser

(57) ABSTRACT

A wind turbine. The wind turbine includes a blade pitch control system to vary a pitch of one or more blades and a turbine controller coupled with the blade pitch control system. A first power source is coupled with the turbine controller and with the blade pitch control system to provide power during a first mode of operation. Uninterruptible power supplies coupled to the turbine controller and with the blade pitch control system to provide power during a second mode of operation. The turbine controller detects a transition from the first mode of operation to the second mode of operation and causes the blade pitch control system to vary the pitch of the one or more blades in response to the transition.

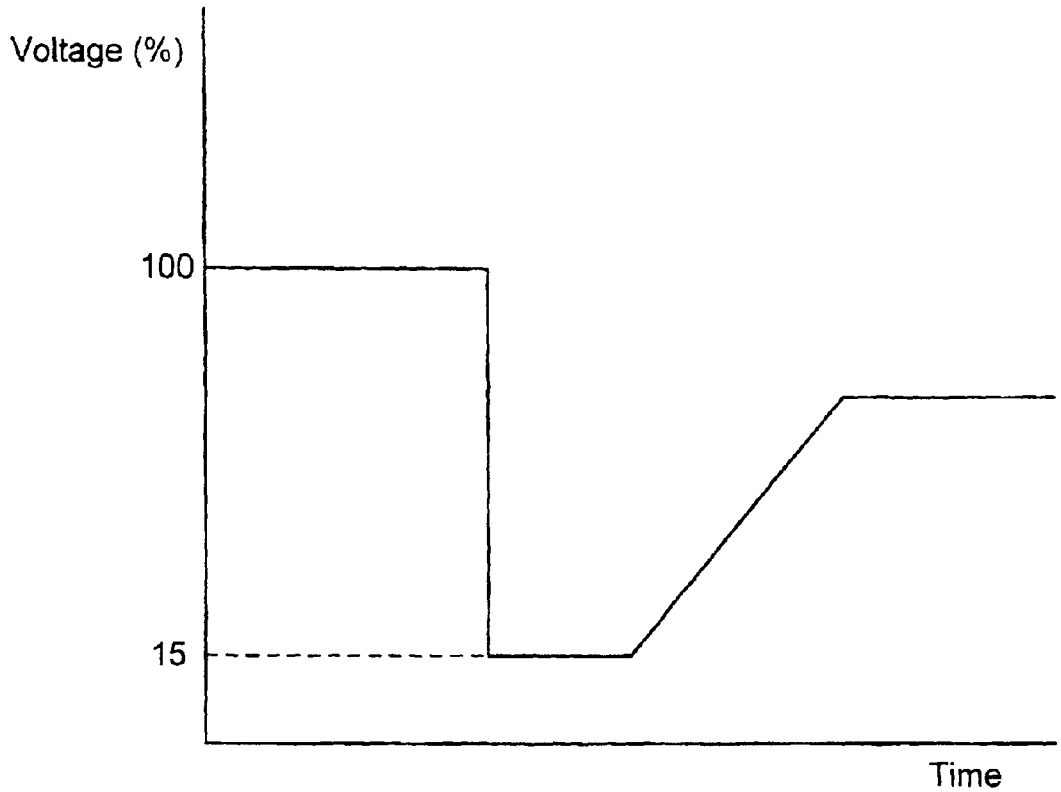

INTER PARTES REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 15-20, 22, 24, 29-32 and 39 is confirmed.

Claims 2, 4 and 5 are cancelled.

Claims 1, 3, 6, 21, 23, 25, 27, 33, 35, 37, 40, 42 and 44 are determined to be patentable as amended.

Claims 7-14, 26, 28, 34, 36, 38, 41, 43 and 45, dependent on an amended claim, are determined to be patentable.

New claims 46-69 are added and determined to be patentable.

1. A wind turbine generator comprising:
   a generator;
   a blade pitch control system to vary a pitch of one or more blades;
   a turbine controller coupled with the blade pitch control system;
   a first power source coupled with the turbine controller and with the blade pitch control system to provide power during a first mode of operation; and
   an uninterruptible power supply coupled to the turbine controller and with the blade pitch control system to provide power during a low voltage event *in which the generator remains connected to a grid when the voltage at the output terminals of the generator is less than 50% of a rated voltage of the generator*;
   wherein *in response to detection of a transition from the first mode of operation to a second mode of operation comprising the low voltage event* the turbine controller causes the blade pitch control system to vary the pitch of the one or more blades in response to the transition [in response to detection of a transition from the first mode of operation].

3. The wind turbine generator of claim [2] *1* wherein the low voltage event occurs for up to 3 seconds.

6. [The] *A* wind turbine generator [of claim 1] *comprising:*
   *a generator;*
   *a blade pitch control system to vary a pitch of one or more blades;*
   *a turbine controller coupled with the blade pitch control system;*
   *a first power source coupled with the turbine controller and with the blade pitch control system to provide power during a first mode of operation; and*
   *an uninterruptible power supply coupled to the turbine controller and with the blade pitch control system to provide power during a low voltage event in which the generator remains connected to a grid and* wherein a low voltage event comprises [a generator] *a voltage at the output terminals of the generator* between 15% and 50% of a rated voltage [for] of the generator;
   *wherein in response to detection of a transition from the first mode of operation to a second mode of operation comprising the low voltage event the turbine controller causes the blade pitch control system to vary the pitch of the one or more blades in response to the transition.*

21. The wind turbine generator of claim 17 further comprising:
    a blade pitch control system to vary a pitch of one or more blades; and a turbine controller coupled with the blade pitch control system, wherein the turbine controller detects a transition from the first mode of operation *to a second mode of operation comprising the low voltage event* and causes the blade pitch control system to vary the pitch of the one or more blades in response to the transition.

23. The wind turbine generator of claim 22 wherein a low voltage event comprises a [generator] *voltage at the* output [voltage] *terminals of the generator* of less than 75% of a rated voltage [for] *of* the generator.

25. [The] *A* wind turbine generator [of claim 22] *comprising:*
    *a generator;*
    *a power converter coupled with the generator, the power converter having an inverter coupled to receive power from the generator, a converter controller coupled with the inverter to monitor a current flow in the inverter wherein the converter controller is coupled to receive power from an uninterruptible power supply during a low voltage event, and a circuit coupled with the input of the inverter and with the converter controller to shunt current from the inverter and generator rotor in response to a control signal from the converter controller;*
    *wherein the converter controller is coupled to the generator to receive power during a first mode of operation and to the uninterruptible power supply to receive power during the low voltage event;*
    *wherein a second mode of operation comprises the low voltage event; and*
    wherein [a] *the* low voltage event *comprises* a [generator] *voltage at the* output [voltage] *terminals of the generator* of less than 50% of a rated voltage [for] *of* the generator.

27. The wind turbine generator of claim [22] *25* wherein a low voltage event comprises a [generator] *voltage at the* output *terminals of the generator* between 15% and 50% of a rated voltage [for] *of* the generator.

33. The method of claim 29 wherein a low voltage event comprises a [generator] *voltage at the* output [voltage] *terminals of the generator* of less than 75% of a rated voltage [for] *of* the generator.

35. The method of claim 29 wherein a low voltage event comprises a [generator] *voltage at the* output [voltage] *terminals of the generator* of less than 50% of a rated voltage [for] *of* the generator.

37. The method of claim 29 wherein a low voltage event comprises a *voltage at the output terminals of the* generator between 15% and 50% of a rated voltage [for] *of* the generator.

40. The apparatus of claim 39 wherein a low voltage event comprises a [generator] *voltage at the* output [voltage] *terminals of the generator* of less than 75% of a rated voltage [for] *of* the generator.

42. The apparatus of claim 39 wherein a low voltage event comprises a [generator output] *voltage at the output terminals of the generator* of less than 50% of a rated voltage [for] *of* the generator.

44. The apparatus of claim 39 wherein a low voltage event comprises a [generator] *voltage at the output terminals of the generator* between 15% and 50% of a rated voltage [for] *of* the generator.

46. A wind turbine generator comprising:
a generator;
a power converter coupled with the generator, the power converter having an inverter coupled to receive power from the generator, a converter controller coupled with the inverter to monitor a current flow in the inverter wherein the converter controller is coupled to receive power from an uninterruptible power supply during a low voltage event, and a circuit coupled with the input of the inverter and with the converter controller to shunt current from the inverter and generator rotor in response to a control signal from the converter controller;
a blade pitch control system to vary a pitch of one or more blades during the low-voltage event;
a turbine controller;
a low voltage event detector;
the generator being coupled with the turbine controller and with the blade pitch control system to provide power during a first mode of operation;
the uninterruptible power supply coupled to the turbine controller and with the blade pitch control system to provide power during the low voltage event in which the generator remains connected to a grid;
wherein in response to detection of a transition from the first mode of operation to a second mode of operation comprising the low voltage event the turbine controller causes the blade pitch control system to vary the pitch of the one or more blades in response to the transition; and
wherein the uninterruptible power supply is arranged to selectively power the blade pitch control system to maintain a rotor speed below a predetermined overspeed limit during the low voltage event.

47. A wind turbine generator comprising:
a generator;
a power converter coupled with the generator, the power converter having an inverter coupled to receive power from the generator, a converter controller coupled with the inverter to monitor a current flow in the inverter wherein the converter controller is coupled to receive power from an uninterruptible power supply during a low voltage event, and a circuit coupled with the input of the inverter and with the converter controller to shunt current from the inverter and generator rotor in response to a control signal from the converter controller;
a blade pitch control system to vary a pitch of one or more blades during the low-voltage event;
a turbine controller;
the generator being coupled with the turbine controller and with the blade pitch control system to provide power during a first mode of operation;
the uninterruptible power supply coupled to the turbine controller and with the blade pitch control system to provide power during the low voltage event in which the generator remains connected to a grid;
wherein in response to detection of a transition from the first mode of operation to a second mode of operation comprising the low voltage event the turbine controller causes the blade pitch control system to vary the pitch of the one or more blades in response to the transition; and
wherein said turbine controller and said converter controller are arranged such that said wind turbine generator remains connected to a power grid during low voltage events.

48. The wind turbine generator of claim 47 wherein said converter controller is arranged to activate and deactivate said circuit to maintain current flow in said inverter within a predetermined range.

49. The wind turbine generator of claim 48 wherein said converter controller activates and deactivates said circuit in response to monitoring said inverter.

50. The wind turbine generator of claim 46 wherein in said first mode of operation the wind generator provides power to the blade pitch control system and blade pitch system motors, and to lubrication and cooling systems.

51. The wind turbine generator of claim 46 wherein during the low voltage event the uninterruptible power supply provides power to wind turbine components necessary to keep the wind turbine generator connected to and synchronized with the power grid.

52. The wind turbine generator of claim 51 wherein during the low voltage event the uninterruptible power supply provides power only to said components.

53. The wind turbine generator of claim 51 wherein said components comprise the power converter, the turbine controller and the blade pitch control system.

54. The wind turbine generator of claim 1, comprising:
a power converter coupled with the generator, the power converter having an inverter coupled to receive power from the generator;
a converter controller coupled with the inverter to monitor a current flow in the inverter, wherein the converter controller is coupled to the generator to receive power during the first mode of operation and to the uninterruptible power supply to receive power during the low voltage event; and
a circuit coupled with the input of the inverter and with the converter controller to shunt current from the inverter and generator rotor in response to a control signal from the converter controller.

55. The wind turbine generator of claim 54 further comprising
a low voltage event detector; and
wherein the uninterruptible power supply is arranged to selectively power the blade pitch control system to maintain a rotor speed below a predetermined overspeed limit during the low voltage event.

56. The wind turbine generator of claim 54 wherein said turbine controller and said converter controller are arranged to cause said wind turbine generator to remain connected to the grid during low voltage events.

57. The wind turbine generator of claim 54 wherein said converter controller is arranged to activate and deactivate said circuit to maintain current flow in said inverter within a predetermined range.

58. The wind turbine generator of claim 54 wherein said converter controller activates and deactivates said circuit in response to monitoring said inverter.

59. The wind turbine generator of claim 54 wherein in said first mode of operation the wind generator provides power to blade pitch control system and blade pitch system motors, and to lubrication and cooling systems.

60. The wind turbine generator of claim 54 wherein during the low voltage event the uninterruptible power supply provides power to wind turbine components necessary to keep the wind turbine generator connected to and synchronized with the power grid.

61. The wind turbine generator of claim 60 wherein during the low voltage event the uninterruptible power supplies power only to said components.

62. The wind turbine generator of claim 60 wherein said components comprise the power converter, the turbine controller and the blade pitch control system.

63. The wind turbine generator of claim 60 wherein said components additionally comprise a rotor speed monitor and a blade pitch control system motor.

64. The wind turbine generator of claim 1 further comprising:
   a low voltage event detector; and
   wherein the uninterruptible power supply is arranged to selectively power the blade pitch control system to maintain a rotor speed below a predetermined overspeed limit during the low voltage event.

65. The wind turbine generator comprising:
   a generator;
   a power converter coupled with the generator, the power converter having an inverter coupled to receive power from the generator, a converter controller coupled with the inverter to monitor a current flow in the inverter wherein the converter controller is coupled to receive power from an uninterruptible power supply during a low voltage event in which the generator remains connected to a grid when the voltage at the output terminals of the generator is less than 50% of a rated voltage of the generator, and a circuit coupled with the input of the inverter and with the converter controller to shunt current from the inverter and generator rotor in response to a control signal from the converter controller;
   a blade pitch control system to vary a pitch of one or more blades during the low-voltage event;
   a turbine controller;
   the generator being coupled with the turbine controller and with the blade pitch control system to provide power during a first mode of operation; and
   the uninterruptible power supply coupled to the turbine controller and with the blade pitch control system to provide power during the low voltage event;
   wherein in response to detection of a transition from the first mode of operation to a second mode of operation comprising the low voltage event the turbine controller causes the blade pitch control system to vary the pitch of the one or more blades in response to the transition.

66. A wind turbine generator arranged to remain connected to a grid during a low voltage event, said wind turbine generator comprising:
   a generator;
   a blade pitch control system;
   a turbine controller coupled with the blade pitch control system;
   a power converter, the power converter having an inverter coupled to receive power from the generator;
   a converter controller;
   a circuit coupled with the input of the inverter and with the converter controller,
   wherein the turbine controller and the converter controller are coupled to receive power from the generator during a first mode of operation and from an uninterruptible power supply during a second mode of operation comprising the low voltage event,
   wherein the converter controller is coupled with the inverter to monitor a current flow in the inverter,
   wherein the circuit is arranged to shunt current from the inverter and generator rotor in response to a control signal from the converter controller, and
   wherein the low voltage event comprises a period of time during which voltage at the output terminals of a generation unit including the generator is less than 50% of the rated voltage of the generator.

67. The wind turbine generator of claim 66 wherein in response to detection of a transition from the first mode of operation to the second mode of operation comprising the low voltage event the turbine controller causes the blade pitch control system to control the pitch of the one or more blades in response to the transition.

68. The wind turbine generator of claim 66 wherein the low voltage event comprises a period of time during which the generator remains connected to the grid.

69. The wind turbine generator of claim 15 wherein said control signal is in response to a transition from a first mode of operation to a second mode of operation comprising the low voltage event in which the voltage at output terminals of a generation unit including the generator is less than 50% of a rated voltage of the generator.

* * * * *